Sept. 24, 1929.     J. C. WOODFORD     1,729,306
CUT-OFF FOR AIR SERVICE DEVICES
Filed May 16, 1927     2 Sheets-Sheet 2
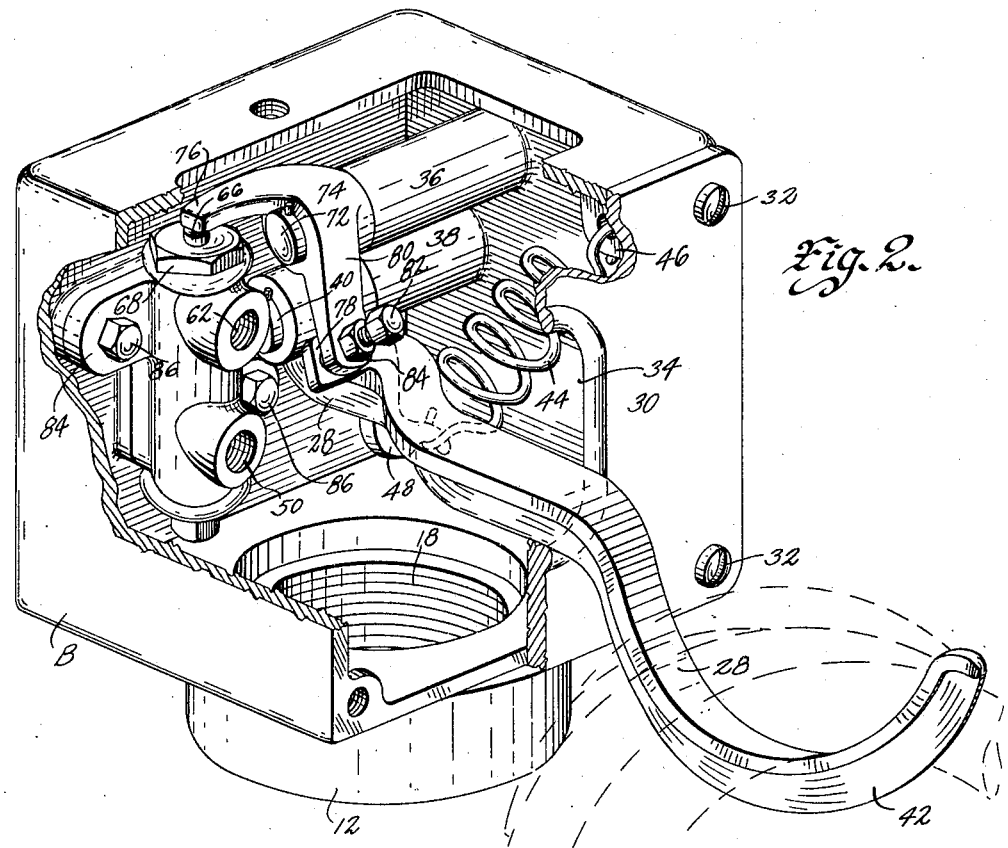
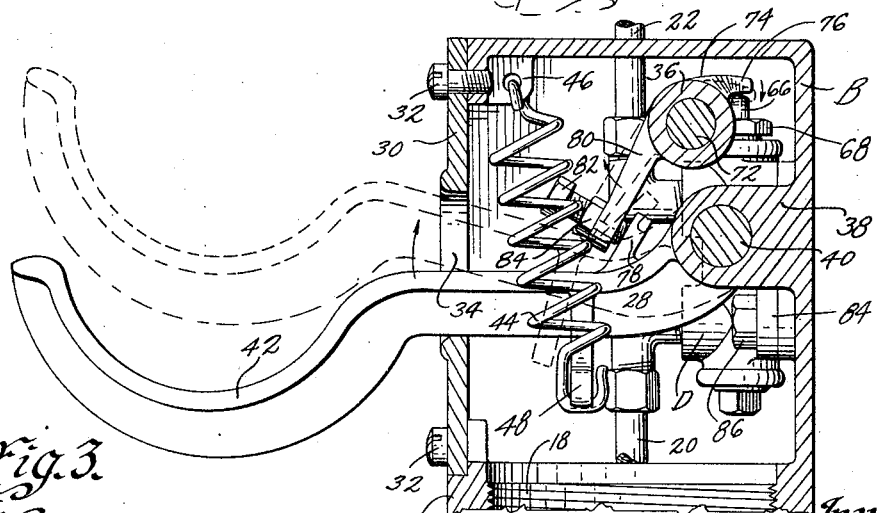

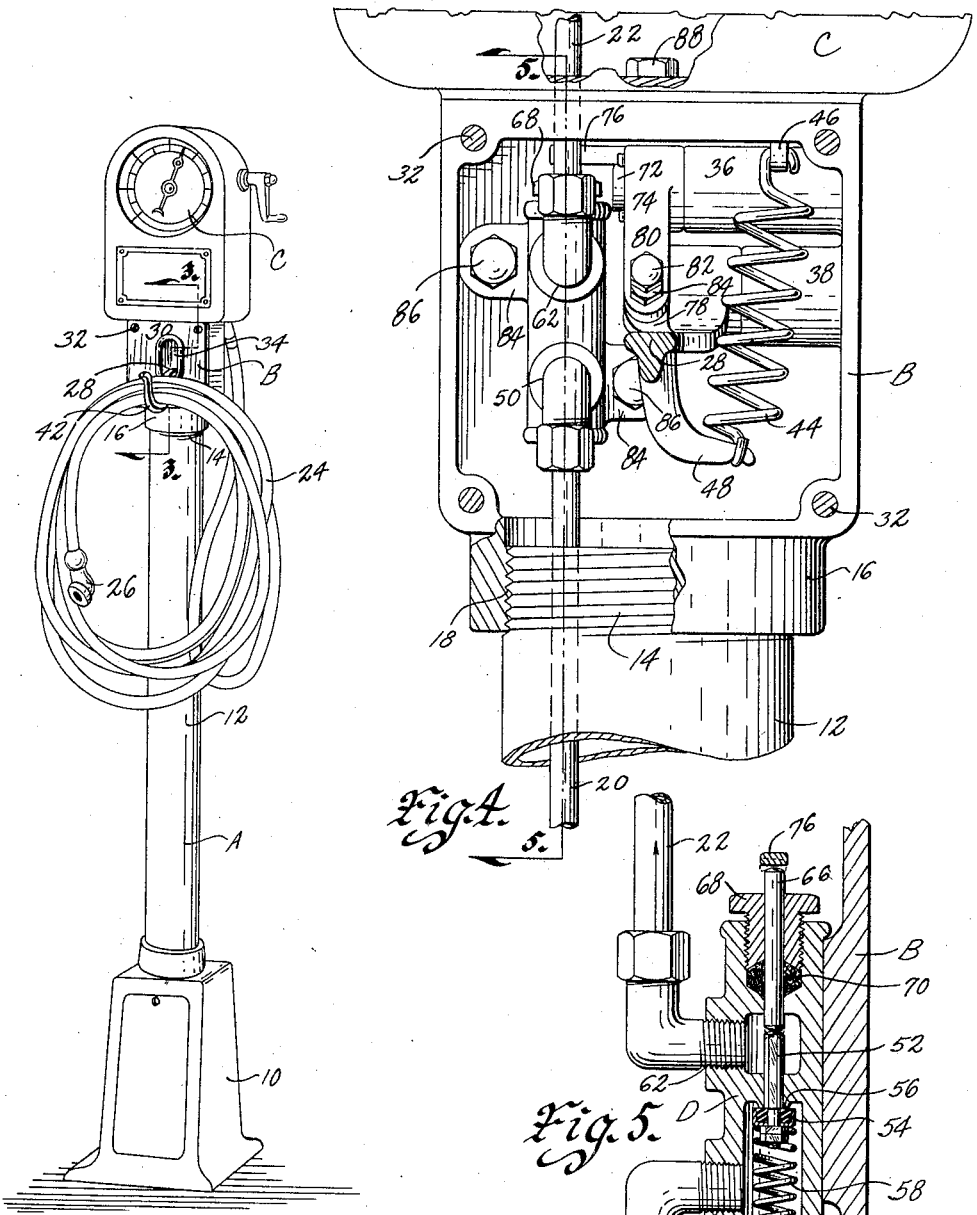

Patented Sept. 24, 1929

1,729,306

UNITED STATES PATENT OFFICE

JOE C. WOODFORD, OF BRYAN, OHIO

CUT-OFF FOR AIR-SERVICE DEVICES

Application filed May 16, 1927. Serial No. 191,708.

The object of my invention is to provide an automatic cut-off for air service devices used for inflating pneumatic tires.

More particularly it is my object to provide a cut-off valve arranged in the air supply line and operable by hanging up the flexible hose upon a hook arm when the hose is not in use and air service not desired.

In air service devices where automatic controls or inflator units are used, it is desirable that the source of air supply be absolutely cut off from the automatic inflator unit so as not to have it operate or function when air service is not desired and it is my object to provide an automatic cut-off arranged to normally remain open and to be closed when the air service hose is not in use and suspended upon a hook arm for retaining the hose off of the ground and out of the way.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of an air tower or standard with my improved automatic cut-off forming a part thereof.

Figure 2 is a perspective view of the cut-off unit, parts of the casing being broken away and shown in section to better illustrate the construction thereof.

Figure 3 is a central vertical sectional view through the cut-off unit, one of the positions of the hook arm which operates the cut-off valve, being shown in dotted lines.

Figure 4 is a front view of the cut-off unit with the cover plate of the casing removed and Figure 5 is a sectional view taken on the line 5—5 of Figure 4 illustrating the cut-off valve assembly.

In the accompanying drawings I have used the reference character A to indicate generally an air tower which includes a base or support 10 having an upstanding standard 12 mounted thereon. The upper end of the standard 12 is screw threaded as at 14.

A casing B houses my entire cut-off mechanism. The casing B is formed with a downwardly extending neck 16 which is interiorly screw threaded as at 18 for coacting with the screw threads 14 of the standard 12. The casing B is thus supported upon the upper end of the standard 12. Positioned upon the casing B is an automatic tire inflator unit or device C.

The inflator unit C is of the kind disclosed in United States Letters Patent No. 1,618,953, dated February 22, 1927. The inflator unit of the patent just referred to, is arranged to allow air to pass from a supply tank to a pneumatic tire until the pressure in the tire reaches a predetermined amount and as set by the user upon the dial of the inflator unit.

The automatic inflator unit C operates intermittently that is, a supply of air is permitted to pass into the tire, then it is cut-off and a further supply is thereafter admitted to the tire until the pressure within the tire reaches the amount as set by the operator. The inflator unit automatically operates and while in operation, continuously rings a bell and as soon as the desired amount of air pressure within the tire is reached, then the bell ceases ringing and the operator knows that he has received the desired amount of air pressure.

The tire inflator unit forms no part of my invention except that my device is desirable with an inflator unit.

There is a certain amount of air always operating upon the inflator unit which is undesirable and causes the unit to operate now and then when as a matter of fact, air service is not desired. My device serves to positively cut off all supply of air pressure to the unit when air service is not desired.

My automatic cut-off, is therefore, interposed between the supply tank and the inflator unit C. Within the standard 12 and leading from an air supply tank (not shown) is a pipe line 20 leading into a cut-off valve D.

A pipe line 22 leads from the cut-off valve D and is in communication with the inflator unit C. Air is carried from the inflator unit C to the pneumatic tire by a flexible hose 24.

The hose 24 is provided at its free end with a chuck 26. When the chuck is placed on a valve stem of an automobile tire, then air may pass from the hose 24 into the tire.

The hose 24 when not in use, is arranged to be suspended or hung over a hook arm 28. The hook arm 28 serves as a control for operation of the cut-off valve D.

I will now describe in detail my cut-off valve unit and its operation. The casing or housing B includes a cover plate 30 arranged to be held in position upon the remaining portion of the housing by screws or the like 32.

The cover plate is provided with a central elongated opening 34 through which the hook arm 28 extends. Within the housing B upon one end wall thereof, I form a pair of bosses 36 and 38. The hook arm 28 is pivotally mounted upon the boss 38 upon a pivot pin or the like 40.

The arm 28 is capable of slight pivotal movement which is limited by the elongated slot or opening 34 in the cover plate 30. The hook arm 28 is formed with a curved or hook portion 42 which is arranged to extend out beyond the casing B and to have the air hose 24 hung thereon as clearly illustrated in Figure 1 of the drawings.

The weight of the hose 24 normally retains the hook arm 28 in its lowermost position. In order to move the hook arm 28 upwardly when the hose 24 is removed, I provide a coil spring 44 having one end connected to a lug 46 formed in the housing B. The other end of the spring 44 is connected to a downwardly and laterally extending finger 48 which is formed integral with the hook arm 28.

The coil spring 44 is contractable and normally tends to swing the hook arm 28 upon its pivot 40 and bringing it to position substantially as indicated by dotted lines in Figure 3 of the drawings. It will, of course, be understood that the weight of the hose is sufficient to overcome the tension of the spring 44 and it is only when the hose is removed from the hook arm 28 that the hook arm assumes the position shown by dotted lines in Figure 3 of the drawings.

The valve D includes an inlet opening 50 which is in communication with the supply pipe 20. Within the valve D is a valve stem 52 having a valve member 54 thereon arranged to rest against a valve seat 56.

A coil spring 58 is positioned within a central opening in the valve casing and normally forces the valve member 54 against its seat 56. A screw cap 60 is mounted within the valve casing and rests against one end of the spring 58. The cap 60 when removed, permits the disassembling and removing of the valve mechanism just described.

The valve D includes an outlet opening 62. The pipe 22 is in communication with the outlet opening 62. When the valve member 54 is unseated, then air from the pipe 20 is permitted to pass through the valve D and into the pipe 22.

It will be noted that the valve D is normally closed. An operating pin 66 is mounted in a packing nut 68 which in turn is screw threaded into the casing of the valve D. A packing 70 is placed within the casing of the valve D and the operating pin 66 passes therethrough. The operating pin 66 has its lower end resting against the upper end of the valve stem 52.

Within the boss 36 is mounted a pin 72 having a cut-off crank 74 pivotally supported thereon. The cut-off crank has an arm 76 extending laterally from the pin 72 and positioned just above the operating pin 66 of the valve D.

Pivotal movement of the cut-off crank 74 imparts movement to the arm 76 causing it to strike against the upper end of the operating pin 66 and moving it downwardly. Such movement in turn causing the valve stem 52 to be moved downwardly for unseating the valve member 54 and thus permitting air from the pipe 20 to pass through the cut-off valve D and into the pipe 22.

In order to operate the cut-off crank 74, I provide an extension 78 upon the hook arm 28 which is positioned just below an arm 80 forming a part of the cut-off crank 74. The arm 80 is provided with a screw threaded opening for receiving an adjusting screw 82.

A nut 84 upon the adjusting screw 82 locks the screw 82 relative to the arm 80. One end of the screw 82 rests against the extension 78 as clearly illustrated in Figures 2 and 3 of the drawings. The adjusting screw makes it possible to so arrange the parts that when the hook arm 28 is in raised position, the valve member 54 will be unseated.

Upward movement of the hook arm 28 imparts upward movement to the arm 80 thus swinging the arm 76 of the cut-off crank 74 downwardly. This movement forces the operating pin 66 downwardly.

The dotted line position of Figure 3 illustrates the position the parts assume when the cut-off valve is opened and the solid lines showing the parts in the position they assume when the cut-off valve is closed. The cut-off valve D is formed with a pair of lateral ears or the like 84 wherein the valve D may be mounted upon the housing B by bolts or the like 86.

It will be noted that the cut-off valve D is arranged to be normally closed and that it is positively opened by the cut-off crank 74 which in turn is caused to move by the coil spring 44 raising the hook arm 28 when the hose 24 is removed therefrom.

It may be here mentioned that the tension of the spring 44 may be such as to allow the hook arm 28 to be raised. It will be noted that in an air tower of the kind described in Figure 1, that it is desirable to support the hose 24 upon some hook or the like so that it is not damaged when lying upon the ground. I have, therefore, combined the hook arm for supporting the hose with a cut-off mechanism thus insuring proper cut-off of the air supply when the hose is in its hung-up position.

When the hose is removed for servicing a tire, then of course, the spring 44 operates and in turn the cut-off valve D is opened. The cut-off device eliminates the possibility of air passing to the inflator unit at times when service is not desired.

The inflator unit casing may be mounted upon the housing B and secured thereto by bolts or the like 88. The casing in which the inflator unit C is mounted may, of course, be formed integral with the housing B.

Some changes may be made in the arrangement and construction of the various parts of my device, without departing from the essential features and purposes of my invention, and it is my intention to cover by my claims any modified forms of structure or use of mechanical equivalents, which may be reasonably included within their scope.

I claim as my invention:

1. A device of the character described comprising a housing, a normally closed valve therein, an air hose receiving air from said valve, a pivoted valve operating arm supported in position to engage said valve and open the same when moved in one direction, a movable hook arm adapted to engage said valve operating arm when moved to one position and a spring operating to so move said hook arm and said valve operating arm, said air hose when hung on said hook arm causing the same to allow said valve to close.

2. A device of the character described comprising a support, a hook arm adapted to support an air hose when the same is not in use, said hook arm being pivoted to said support and extending through a slot therein, a spring for normally holding said hook arm adjacent the top of said slot, said hose moving said hook arm to the bottom of said slot when the hose is hung on the hook and a valve on said support for controlling the supply of air to said hose and a valve operating arm pivoted on said support and adapted to be engaged by said hook arm and in turn to engage and operate said valve when the hose is removed from the hook arm said spring causing operation of the pivoted arm.

3. An air supply cut-off device including a supply line of air, a normally closed cut-off valve interposed therein, a flexible air supply hose in communication with said supply line, a movable hook arm for supporting the hose when not in use, and means of connection between the hook arm and said cut-off valve, said means coacting with the cut-off valve only when the arm is in raised position, whereby operation of the cut-off valve from said hook arm is effected and yielding means normally tending to move said hook arm to position for opening said cut-off valve.

4. An air supply cut-off device including a supply line of air, a cut-off valve interposed therein, a flexible air supply hose in communication with said supply line, a movable hook arm for supporting the hose when not in use and means of connection between the hook arm and said cut-off valve for operating the latter from said hook arm, said means comprising a crank arm having one end adapted to engage said cut-off valve and its other end in engagement with said hook arm when the hook arm is raised and means of adjustment on said first mentioned end.

5. An air supply cut-off device including a supply line of air, a cut-off valve interposed therein and normally constrained to remain closed, a flexible air supply hose in communication with said supply line, a movable hook arm for supporting the hose when not in use and an adjustable means of connection between the hook arm and said cut-off valve for opening the latter when the hose is removed from the hook arm, said means of connection comprising a pivoted arm having one end adapted to engage said cut-off valve and its other end in engagement with said hook arm when the hook arm is raised.

Des Moines, Iowa, May 4, 1927.

JOE C. WOODFORD.